United States Patent [19]
Komine et al.

[11] 3,967,886
[45] July 6, 1976

[54] MOTION PICTURE CAMERA CAPABLE OF SYNCHRONIZED SOUND RECORDING

[75] Inventors: Yoshio Komine, Tokyo; Kazuya Hosoe, Machida; Mamoru Shimazaki, Tokyo; Toshikazu Ichiyanagi, Tokyo; Kiyoshi Takahashi, Kunitachi, all of Japan

[73] Assignee: Canon Kabushiki Kaisha, Tokyo, Japan

[22] Filed: Oct. 2, 1974

[21] Appl. No.: 511,206

[30] Foreign Application Priority Data
Oct. 5, 1973   Japan.............................. 48-112634

[52] U.S. Cl.................................... 352/29; 352/26; 352/27; 352/30; 352/72; 352/78 R; 354/288
[51] Int. Cl.².......................................... G03B 23/02
[58] Field of Search ................. 352/72, 78, 242, 26, 352/27, 29, 30; 354/288

[56] References Cited
UNITED STATES PATENTS
| | | | |
|---|---|---|---|
| 3,405,945 | 10/1968 | Braeth ................................... | 352/29 |
| 3,825,327 | 7/1974 | Kosarko et al........................ | 352/72 |

*Primary Examiner*—L. T. Hix
*Assistant Examiner*—Russell E. Adams, Jr.
*Attorney, Agent, or Firm*—Toren, McGeady and Stanger

[57] ABSTRACT

The present invention relates to a motion picture camera which includes an openable cover for loading a film magazine containing a film capable of recording sound information. A sound recording device for recording the sound information on the film and a movable device for moving either the sound recording device or the film to a position at which the sound can be recorded is also included. An operation device for operating the opening and the closing of the openable cover can be displaced to three positions, i.e. the first, the second and the third position. The operation is carried out stepwise so that, at the first position, the movable device operates while the openable cover is locked; at the second position, the movable device does not operate while the openable cover is locked; and at the third position, the movable device does not operate while the openable cover is freed. At least one of the three position being non-linear with respect to the other two.

13 Claims, 8 Drawing Figures

MOTION PICTURE CAMERA CAPABLE OF SYNCHRONIZED SOUND RECORDING

BACKGROUND OF THE INVENTION

1. Field of the Invention

The present invention relates to a motion picture camera capable of synchronized recording of the sound information on the sound recording portion while photographing by means of a film magazine containing a film presenting a sound recording portion.

2. Description of the Prior Art

In the recent field of motion picture cameras in which 8 mm films are used, film contained in a magazine which can easily be loaded in the camera has become utilized to a greater extent.

Further, quite recently, a type of film magazine containing a film presenting a sound recording portion and which can be loaded easily in a motion picture camera capable of synchronized sound recording while photographing has appeared on the market. This kind of the film magazine is designed in such a manner that, beside the conventional opening for taking pictures, an opening for sound recording is provided. At such opening, the film for sound recording is fed at a constant speed while the sound is recorded on the sound recording portion, consisting of a magnetic coating provided on the film, by means of a sound recording means such as a magnetic head. In the film magazine chamber of a motion picture camera in which a film magazine for synchronized sound recording is employed, at the position corresponding to the opening of the magazine for sound recording, various elements participating in sound recording, such as a capstan for continuous feeding of film, a pinch roller, a magnetic head, a head pad, a film guide and so on are provided. The elements are arranged so that capstan can be removed from the pinch roller and the magnetic head from the head pad when the film magazine is loaded into or taken out of the motion picture camera in order that the film can easily be inserted between them. Further, they have to be designed in such a manner that, during the operation of the motion picture camera after the film magazine having has been loaded, the capstan is brought in contact with the pinch roller under pressure so that the film between them is fed at a constant speed while the magnetic head is also brought in contact with the head pad under pressure so that the sound is recorded magnetically on the sound recording portion of the film.

For this purpose, generally, the capstan, the magnetic head or the like are made a sound recording unit fixed in the film magazine chamber, while the pinch roller, the head pad, the film guide or the like are made movable means. Accordingly in functional engagement with the operation for loading the film magazine in or for taking the film magazine out of the motion picture camera, the above mentioned movable means are brought in contact with the above mentioned sound recording under pressure or removed from them.

In order to control the above mentioned movable means being in functional engagement with the operation for loading the film magazine in the motion picture camera or for taking the film magazine out of the motion picture camera so as to bring the above mentioned movable means in contact with the above mentioned sound recording means or to remove the former from the letter, in a conventional motion picture camera an operation means capable of controlling both of the openable cover for loading a film magazine in the magazine chamber and the above mentioned movable means and also capable of sliding to and fro along a straight line is provided. This is done in such a manner that the above mentioned movable means is operated according to the quantity of the first slide movement and the openable cover is locked to the motion picture camera or freed according to the quantity of the second slide movement. However in the case of the conventional method to control the openable cover and the movable means according to the quantity of the slide movement along a straight line, the openable cover and the movable means are operated by moving the operation means only along one direction, especially the openable cover is opened, so that there is a great possibility that the operation means could be misoperated to open the openable cover in the course of photographing. Further, the openable cover may be opened by contact with other things during the transportation or by some mischievous children when the motion picture is put somewhere during a pause.

SUMMARY OF THE INVENTION

The first purpose of the present invention is to provide a motion picture camera capable of synchronized sound recording without the weakpoints of conventional motion picture camera.

The second purpose of the present invention is to provide a motion picture camera capable of synchronized sound recording in which camera neither the sound recording state nor the lock of the openable cover can be freed only by pressure along one direction nor can the openable cover be opened by mere contact with other things.

The third purpose of the present invention is to provide a motion picture camera capable of synchronized sound recording out of which camera the operation means does not protrude when it is not necessary to operate the openable cover.

The fourth purpose of the present invention is to provide a motion picture camera capable of synchronized sound recording in which camera only the movable means are operated when the operation means is moved only along one direction, whereby the openable cover is not opened.

The fifth purpose of the present invention is to provide a motion picture camera capable of synchronized sound recording in which camera the sound recording unit consisting of a capstan, a recording head and so on is brought into contact with the movable means consisting of a pinch roller, a head pad and so on or is removed from the movable means when the operation member of the magazine chamber is moved along the first direction while the lock of the openable cover for magazine chamber is freed when the operation member is moved along the second direction other than the first direction.

The sixth purpose of the present invention is to provide a motion picture camera capable of synchronized sound recording in which camera at least either the sound recording circuit or the driving circuit for the capstan is opened when the movable means are removed from the sound recording unit.

The further other purposes of the present invention will be explained in detail according to the attached drawings.

DESCRIPTION OF THE PREFERRED EMBODIMENTS

Below, the motion picture camera capable of synchronized sound recording according to the present invention will be explained according to the attached drawing off several embodiments.

Figure 1:
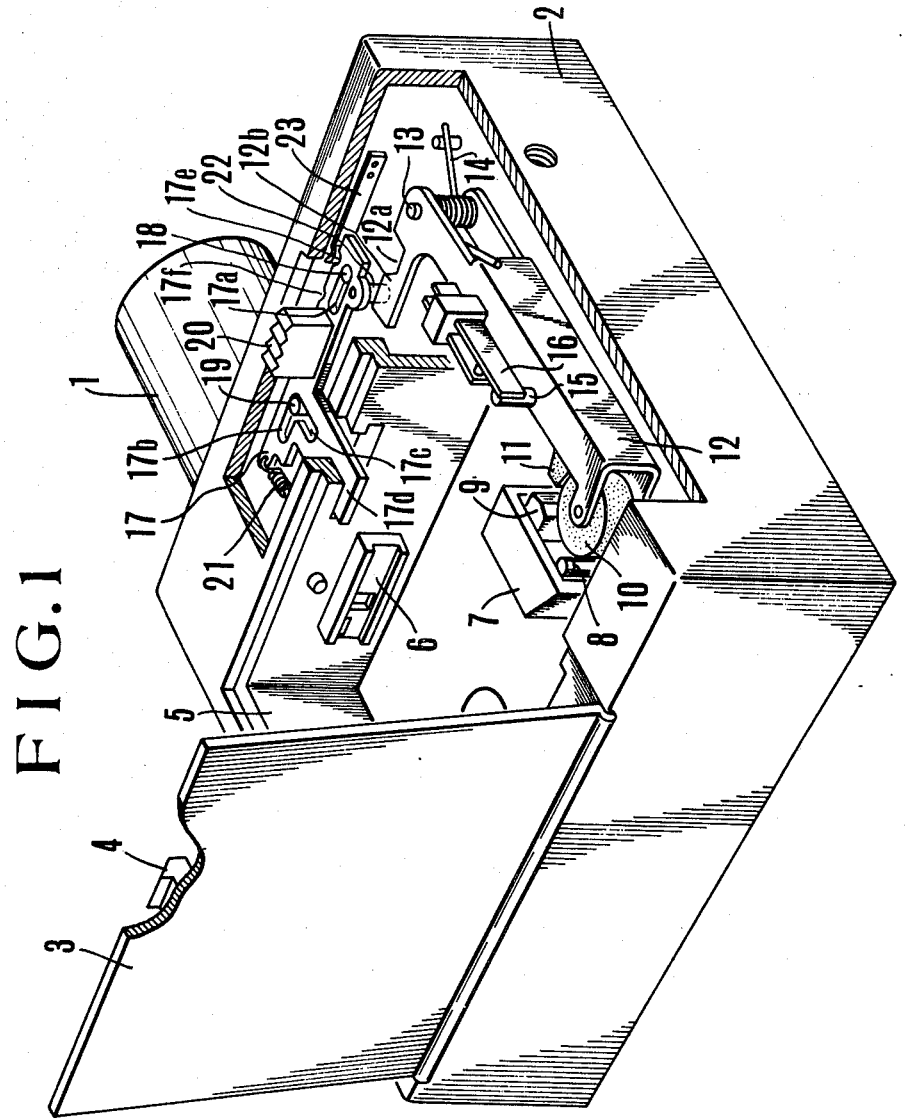
FIG. 1 is a partly cut-open perspective view of the first embodiment of the motion picture camera according to the present invention.

FIG. 1 shows a perspective view of the important construction of the motion picture camera according to the present invention, whereby, for the sake of easy understanding, a part of the openable cover of the magazine chamber is shown in section. In the drawing, 1 is the photographing lens, 2 the camera body, 3 the cover for the magazine chamber for the film magazine capable of synchronized sound recording, 4 the locking member provided on the cover 3 for locking the same, 5 the magazine chamber, 6 the gate for the photographing and 7 the sound recording unit containing a capstan 8 to be driven with the fly wheel by means of a film driving motor not shown in the drawing and a sound recording head. 10 is the pinch roller which is provided opposite to the capstan and is to be brought in contact with the capstan under pressure, 11 the head pad provide opposite to the sound head, whereby they are disposed on the movable means 12. 13 is the rotary shaft of the movable means 12 which lays under pressure of the spring 14 in such a direction that the pinch roller 10, the head pad 11 and so on are brought in contact with the sound recording unit 7 under pressure. 12a is a concave part provided on a part of the L-shaped part of the movable member 12 and 12b a convex part. 15 is a pin being provided on the movable member 12 and engaged with the switch 16 provided on the camera body. The switch 16 is the switch which is normally closed and is intended to open the sound recording circuit to be explained later. 17 is a slide member which is slidable upwards and downwards in the drawing by means of the long grooves 17a, 17b in which the pins 18 and 19 engage. The long groove 11b is connected with the long groove 17c almost at the right angle at one end. 20 is the operation nob making one body with the slide member 17. 17d is a lock piece projecting into the magazine chamber 5 and making a part of the slide member being engaged with the lock member 4 of the cover 3 of the magazine chamber. 21 is a spring which is so designed as to push the lock piece 17d always into the magazine chamber. 22 is a pin being provided on the slide member 17, whereby according to whether the pin 22 engages with the concave part 12 or with the convex part 12b of the movable member 15, the movable member 12 engage with the sound recording unit 7 or disengages therefrom. 17e and 17f are the click grooves for determining the upper and the lower slide position of the slide member 17 and 23 the click spring presenting an engaging part to be engaged in the grooves.

Figure 2:
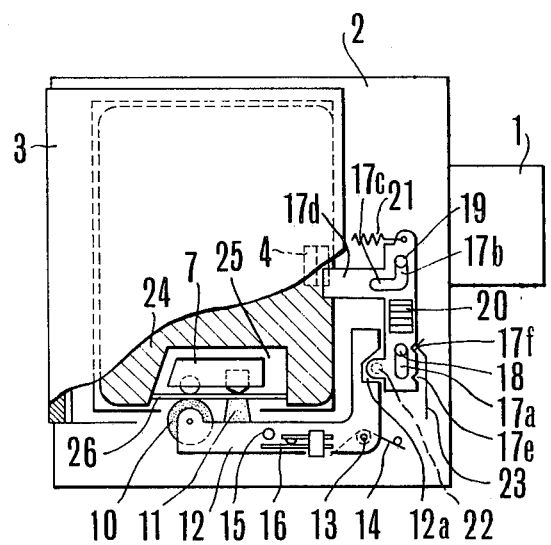
FIG. 2 shows an elevation of the motion picture camera of FIG. 1 during the sound recording whereby 24 is the magazine for the synchronized sound recording.
Figure 3:
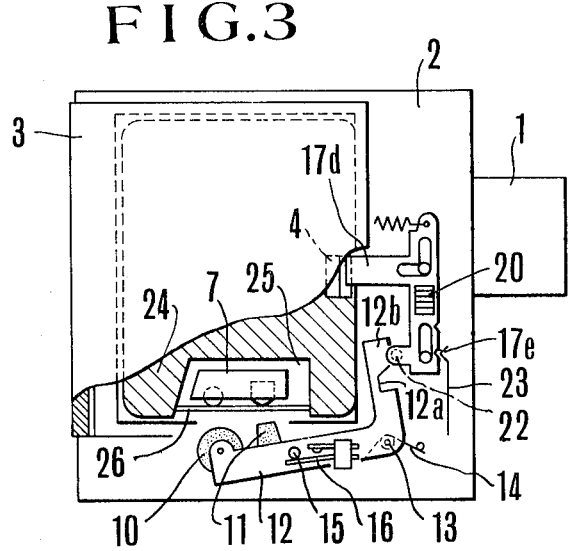
FIG. 3 also shows an elevation of the motion picture camera of FIG. 2 whereby the nob for opening and closing the cover has been moved along the first direction.
Figure 4:
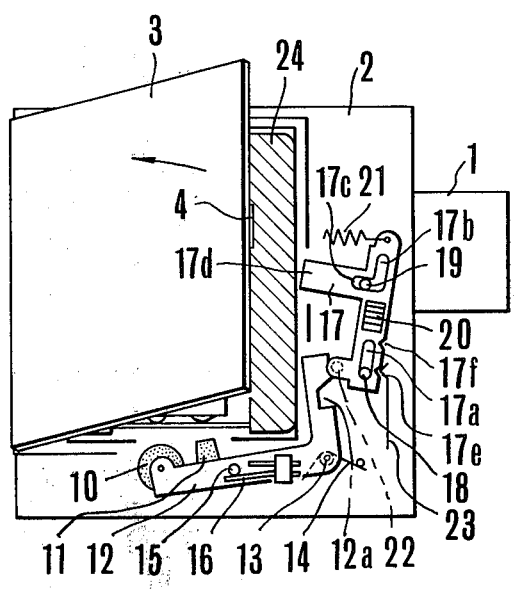
FIG. 4 shows an elevation of the motion picture camera of FIG. 2 whereby the nob for opening and closing the cover has been moved along the second direction.

FIG. 2 to FIG. 4 are respectively a drawing for explaining the operation of elements relative to the opening and the closing of the cover 3 of the magazine chamber of the motion picture camera shown in FIG. 1.

FIG. 2 shows a state in which the film magazine capable of synchronized sound recording is loaded in the above mentioned motion picture camera and the cover of the magazine chamber is closed. In the drawing, 24 shows the film magazine capable of synchronized sound recording, 25 the opening for the sound recording of the film magazine and 26 the film presenting a sound recording portion. In this state, ready for operation, the operation nob 20 has been pulled down while the pin 22 on the slide member 17 is engaged in the concave part 12a of the movable means 15 so that the movable member 12 is allowed to rotate clockwise by means of the spring 14 and the pinch roller 10 and the head pad 11 are brought in contact with the sound recording unit 7 under pressure by means of the film 26. The pin 15 on the movable member 12 has been removed from the switch 16 so that the sound recording unit is closed. The lock member 4 of the cover of the magazine chamber is kept by means of the metal piece 17d of the slide means in such a position that the cover 3 is closed.

FIG. 3 shows the motion picture camera shown in FIG. 2 whereby the operation nob 20 has been lifted upwards in the drawing. With the upward movement of the slide member 17, the pin 22 is moved out of the concave part 12a of the movable member on the convex part 12b. In this way the movable member 12 is rotated clockwise around the shaft 13 and the pinch roller 10, the head pad 11 and so on (preferably including the loop sensor or the film guide for controlling the speed in contact with the film) are removed from the sound recording unit 7 in such a manner that the pin 15 opens the switch 16 to switch off the sound recording circuit. The slide member 17 is kept in this position by means of the click groove 17f and the plate spring 23.

Still in this state, the lock piece 17d is engaged with the lock member 4 so that the cover 3 of the magazine is kept closed.

FIG. 4 shows a motion picture camera shown in FIG. 3 whereby the operation nob 20 has been turned clockwise around the pin 18 against the spring 21. The operation along the second direction following the operation along the first direction shown in FIG. 3 is made possible by means of the long groove 17c in the slide member. With this operation along the second direction, the lock piece 17d making a part of the slide member is moved to the right in FIG. 4, in such a manner that the engagement of the lock member 4 of the cover 3 of the magazine chamber is solved arranged. In this way, the cover of the magazine chamber becomes openable and the magazine 24 can be taken out. At this time, the relation between the pin 22 and the convex part 12b of the movable member has not been changed from that shown in FIG. 3 so that the movable member 12 is kept in the state shown in FIG. 3. When the operation nob 20 is left alone, the slide member 17 returns in the state shown in FIG. 3 by means of the spring 21.

With reference to the loading of the film capable of synchronized sound recording, the operation nob 20 is moved from the position shown in FIG. 3 to the position shown in FIG. 2 after the cover 3 in FIG. 4 is opened and the film magazine is loaded at a certain determined position so that the cover 3 is kept closed, whereby further, the pinch roller 10 and the head pad 11 are brought in contact with the sound recording unit 7 under pressure in such a manner that everything is ready for synchronized sound recording.

Figure 5:
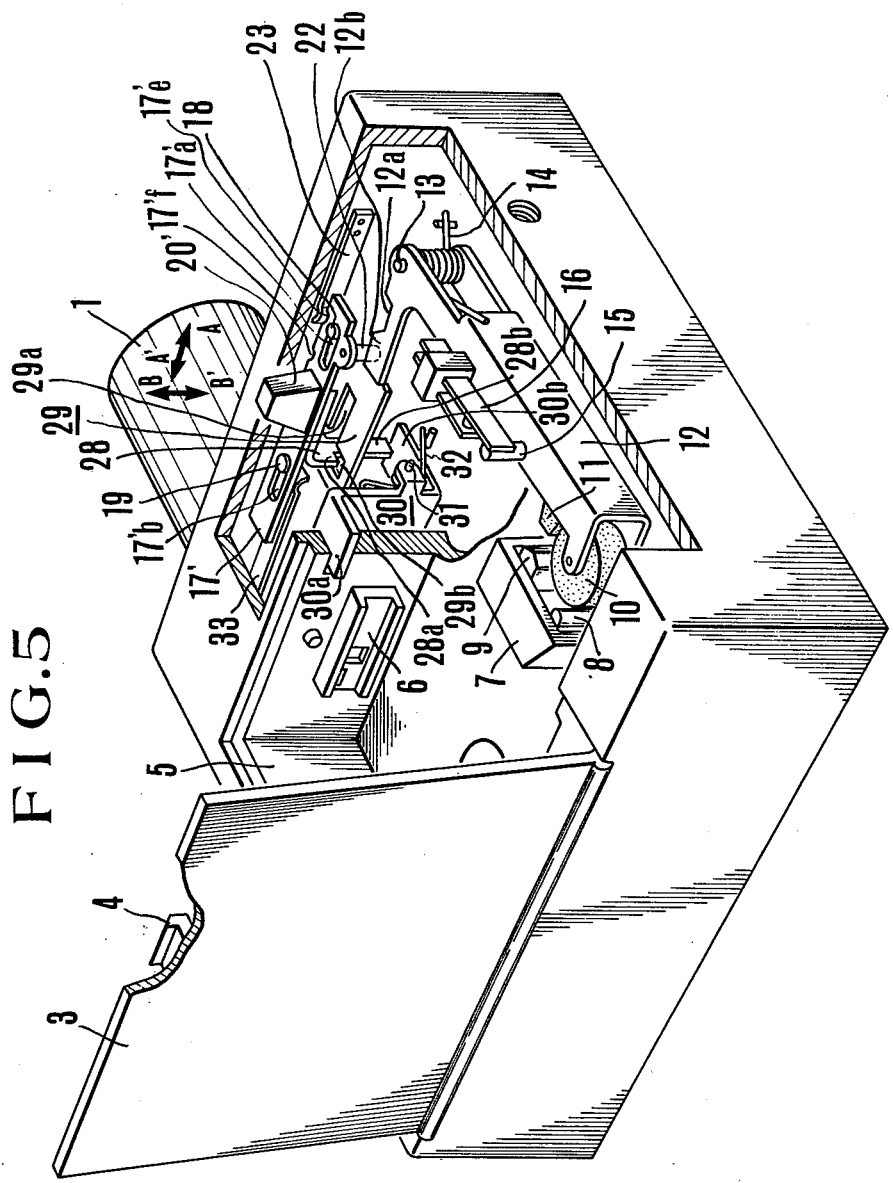
FIG. 5 shows a partly cut-open perspective view of the second embodiment of the motion picture camera capable of synchronized sound recording according to the present invention.

FIG. 5 shows a perspective view of the important construction of the second embodiment of the motion picture camera capable of synchronized sound recording according to the present invention, whereby the member presenting the same numerical figure as that of the first embodiment shown in FIGS. 1 to 4 assumes the same operation.

17' is a slide member corresponding to that 17 of FIG. 1, and includes long grooves 17'a and 17'b in which the pins 18, 19 provided on the camera body engage and is slidable being guided by means of the pins 18 and 19. 17'e and 17'f are the click grooves having the same operation as those 17e and 17f shown in FIG. 1. 20' is an operation nob corresponding to that 20 shown in FIG. 1 and is slidable to and fro along the direction A —A ' and B —B ' at the end of the direction A —A ' shown in FIG. 5.

28 is the lock releasing member fixed on the above mentioned slide member 17' and presents a wider part 28a and a narrower part 28b which projects further than the wider part 28a. 29 is a guide plate of the lock releasing member 28 and presents a long guide groove 29a extending toward the slide direction of the slide member 17' and another long guide groove 29b wider than the former groove 29a at the one end (in slide direction A' of the slide member 17') of the former goove 29a. The long guide groove 29a is a little larger than the part 28b of the lock releasing member 28 but a little smaller than the part 28a in width. The long guide groove 29b is a little larger than the part 28a of the lock releasing part 28 in width. So long as the lock releasing member 28 is in the long guide groove 29a, the operation nob 20 is not displaced along the direction B', being hindered by the part 28a and the long guide groove 29a even if the nob 20 is pushed along the direction B'. So long as, on the other hand, the operation nob 20 is in the long guide groove 29b the nob 20 can be displaced along the direction B' because the part 28a enters into the long guide groove 29b, when the nob 20 is pushed along the direction B'. 30 is the lock piece in form of a bell crank corresponding to that 17d shown in FIG. 1, and includes claws 30a and 30b at both ends and is born rotatably by means of the shaft 31 while the lock piece 30 is normally pushed counterclockwise by means of the spring 32. The claw 30a is engaged with the lock member 4 of the cover 3 of the magazine chamber or disengaged therefrom according to the rotation of the lock piece 30a, whereby the claw 30a is in a position capable of engaging with the lock member 4 when the lock piece 30a has been rotated anticlockwise, while it is in the position incapable of engaging with the lock member 4 when the lock piece 30a has been rotated clockwise. The claw 30b is brought in contact with the part 28b of the lock releasing member 28 when the operation nob 20 is displaced along the direction A' in the drawing, whereby the lock piece 30 is pushed clockwise by means of the part 28b of the lock releasing member 28 so as to be rotated clockwise against the strength of the spring 32 when the operation nob 20 is pushed along the direction B' in the drawing. In other word, the claw 28a is out of the position capable of engaging with the lock member 4. When then the operation nob 20 has been displaced along the direction A' in the drawing and the pressure along the direction B' at the position A' in the drawing is removed, the lock piece 30 is displaced counterclockwise by means of the pressure of the spring 32 in such a manner that the claw 28a is out of the position capable of engaging with the lock member 4. 33 is a plate spring member always pushing the slide member 17' along the direction B.

Below, the operation of the thus composed second embodiment will be explained below.

In the state corresponding to that of the first embodiment shown in FIG. 2 (the state ready for operation in which the film magazine 24 for synchronized sound recording is loaded in the magazine chamber) the slide member 17' making one body with the operation nob 20' similarly to that shown in FIG. 2 has been displaced along the direction A in the drawing in such a manner that the click spring 23 is in the click groove 17'f of the slide member 17'. In this state the movable member 12 and the switch 16 are in the same state as that shown in FIG. 2 while the narrower part 28b of the lock releasing member 28 disposed on the slide member 17' is situated at the long narrower guide groove 29a of the guide plate. Even if the operation nob 20' is pushed along the direction B' in the above mentioned state, the claw 30a is kept in engagement with the lock member 4 because the part 28a of the lock releasing member 28 strikes at the guide plate 29 and does not affect the lock piece 30 in such a manner that the cover 3 of the magazine chamber is kept in the closed state. When then the operation nob 20' is slided along the direction A', similarly to the case with the first embodiment the movable member 12 is removed from the sound recording unit 7 and at the same time the switch 16 is opened in such a manner that the state corresponding to that shown in FIG. 3 is resumed, which also corresponds to the state of the third embodiment shown in FIG. 6 whereby the lock releasing member 28 is disposed at the position of the guide groove 29b of the guide plate 29. when further the operation nob 26' is pushed along the direction B' against the strength along the direction B of the plate spring 33 whereby the lock releasing member 28 has been situated at the position of the guide groove 29b of the guide plate 29, the part 28a of the lock releasing member 28 does not strike against the guide plate 29 and enters into the guide groove 29b so that the end part 28b of the member 28 pushes the claw 30b of the lock piece 30 in such a manner that the lock piece 30 is rotated clockwise against the strength of the spring and thus the claw 30a is removed from the lock piece 4 of the cover 3 of the magazine chamber. In this way the cover 3 of the magazine chamber can be opened and closed freely in such a manner that the loading and the unloading of the magazine become possible.

The relation between the pin 22 and the convex part 12b of the movable member 12 at this time is same as that of the first embodiment and kept in the state shown in FIG. 5, whereby the slide member 17' is returned along the direction B together with the operation nob 20' by means of the strength of the plate spring 33 and the spiral spring 32 and kept at the position when the operation nob 20 is left alone.

When then the cover 3 of the magazine chamber is to be closed, the operation nob 20' is pushed again along the direction B, the lock piece 30 is rotated clockwise, the cover 3 of the magazine chamber is closed and then the operation nob 20' is left alone, whereby the lock piece 30 is rotated anticlockwise in such a manner that the claw 30a engages with the lock piece 4. When the operation nob 20' is further displaced along the direction A in the drawing, the state corresponding to that of the first embodiment shown in FIG. 2 is assumed in such a manner that the synchronized sound recording of film becomes possible.

Figure 6:
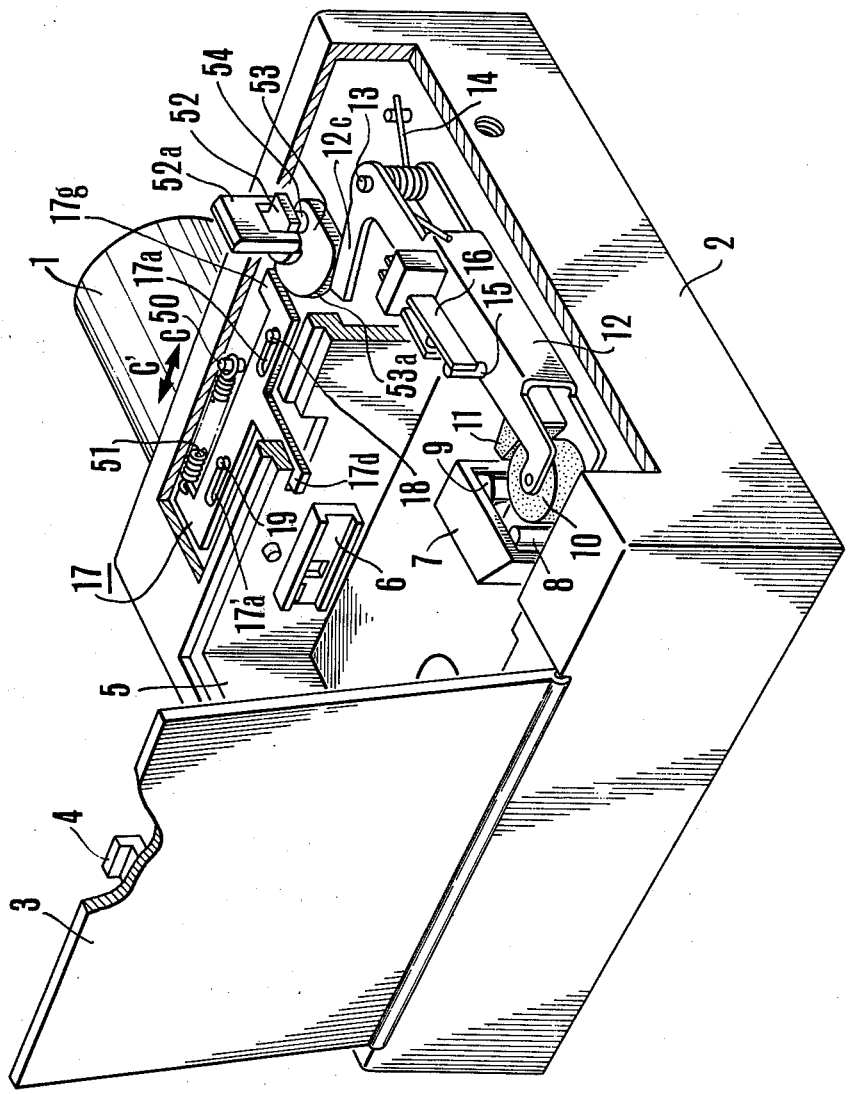
FIG. 6 shows a perspective view of the third embodiment of the motion picture camera capable of synchronized sound recording according to the present invention.

FIG. 6 shows a perspective view of the third embodiment of the motion picture camera capable of synchronized sound recording according to the present invention, whereby for the sake of easy understanding a part of the external cover has been cut open. Further the element presenting the same numerical figure as that of the first embodiment shown in FIG. 1 to FIG. 4 is the corresponding one presenting the same effect. In the drawing, 1 is the photographing lens, 2 the camera body, 3 the cover of the magazine chamber in which a film magazine capable of synchronized sound recording is loaded, 4 the lock member provided one the cover for locking the cover, 5 the film magazine chamber, 6 the gate for the photographing film and 7 the sound recording unit containing a capstan 8 driven with a fly wheel by means of a motor not shown in the drawing and a sound recording head 9. 10 is a pinch roller which is provided opposite to the capstan and brought in contact with the capstan under pressure and 11 the head pad which is provided on a movable member 12 opposite to the sound head. 13 is the rotating shaft of the movable member 12 which is normally pushed by means of a spring 14 in such a manner that the pinch roller 10 and the head pad are brought in contact with the sound recording head 7 under pressure. 12c is the L-shaped part of the movable part. 15 is a pin which is disposed on the movable member 12 so as to engage with the switch 16 provided on the camera body. The switch 16 is the switch which is normally closed for opening the sound recording circuit to be explained. 17 is a slide member which is slidable along the grooves 17a and 17a' in which the pins 18 and 19 fixed on the camera body engage, whereby the slide member 17 is normally pulled downwards (along the direction C in the drawing) by means of a spring 51 provided between the pin 50 fixed on the camera body and the slide member 17. 17d is a lock piece which projects into the magazine chamber 5 and makes a part of the slide member 17 engageable with the lock member 4 of the cover 3 of the magazine chamber. 52 is the operation nob which presents a nob part 52a to be raised when it is used. The operation nob 52 is so designed as to be buried in the camera body when it is not used. 23 is the rotating shaft fixed on the camera body, of the operation nob 52. 53 is a rotary operation cam making one body with the operation nob 52, whereby the operation cam 53 presents an arc-shaped part 53a. The end 17g of the slide member 17 is normally in contact with the operation cam 53 by means of the spring 51. Further the L-shaped part 12c of the movable member is normally in contact with the operation cam 53 by means of the spring 17. FIG. 6 shows the state in which the cover 3 of the magazine chamber is opened, the operation nob 52 being rotated for loading the film magazine, whereby the movable member 12 presenting the pinch roller 10, the head pad 11 and so on have been removed from the sound recording unit 7.

Figure 7:
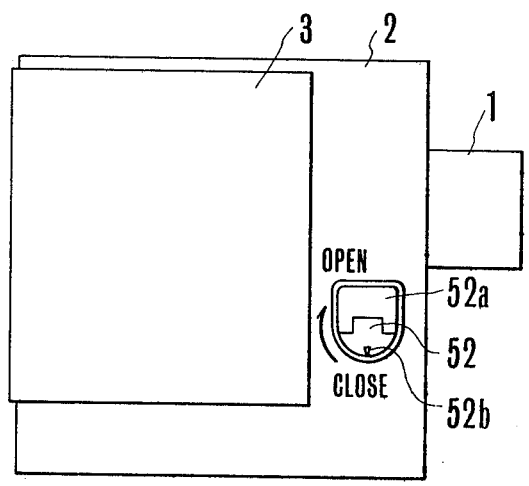
FIG. 7 shows the external appearance of the motion picture camera shown in FIG. 6.

FIG. 7 shows the external appearance of the motion picture camera according to the present invention after the loading of the film magazine 24, whereby the index 52b of the operation nob 52 is at the position "CLOSE". When hereby the part 52a of the operation nob 52 is raised and turned along the direction of the arrow in the drawing, the state shown in FIG. 6 is assumed.

Figure 8:
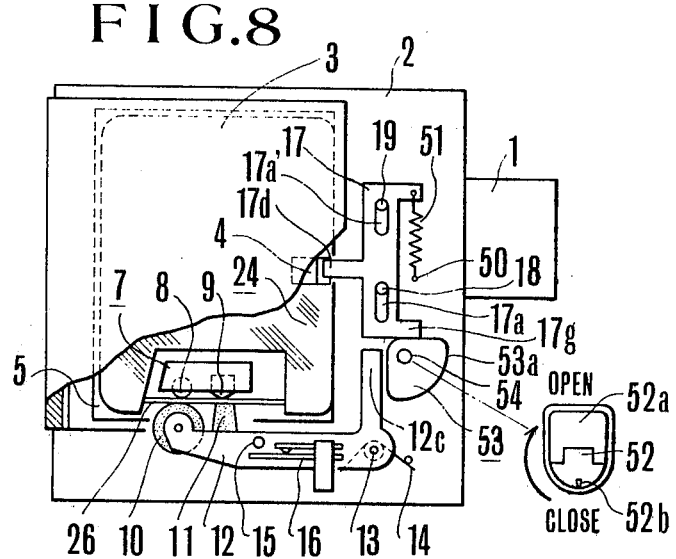
FIG. 8 shows an elevation of the motion picture camera during the sound recording operation shown in FIG. 6 whereby 24 is a magazine for synchronized sound recording.
Figure 9:
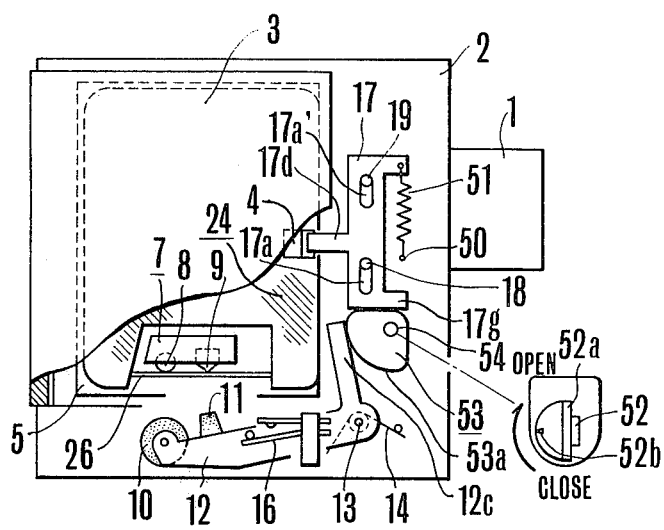
FIG. 9 shows an elevation of the motion picture camera shown in FIG. 6 whereby the opening and the closing nob has been turned clockwise to the middle position.
Figure 10:
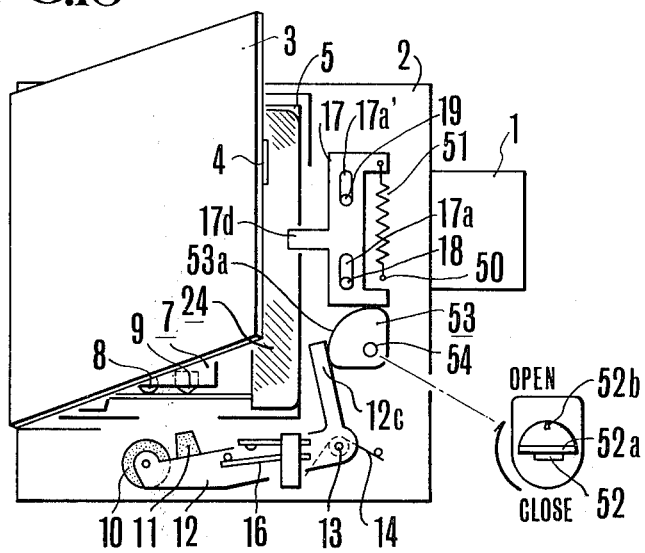
FIG. 10 shows an elevation of the motion picture camera shown in FIG. 6 whereby the opening and closing nob has been turned from the position shown in FIG. 9 counter clockwise to the final position.

FIG. 8 to FIG. 10 respectively shows the process of the operation of the movable means and the lock releasing operation of the openable cover according to the rotary operation of the operation nob 52, whereby in the lower part of the right the corresponding position of the operation nob 52 is shown.

FIG. 8 shows the inside of the motion picture camera shown in FIG. 7, whereby the film magazine 24 capable of recording sound information has been loaded in the magazine chamber 5. In the state shown in the drawing the arc shaped part 53a of the operation cam 53 which makes one body with the operation nob 52 is not in contact with the end 17g of the slide member and the L-shaped part 12c of the movable member 12. In this way the lock piece 17d of the slide member 12 engages with the lock part 4 of the cover 3 of the magazine chamber so as to keep the cover 3 closed. Further the pinch roller 10 and head pad 11 provided on the movable member 12 are in contact with the capstan 8 and the sound recording head 9 by means of the spring 14 under pressure 14, clamping the film 26 presenting the sound recording portion. Further the switch 16 of the sound recording circuit is closed so as to be ready for sound recording, because the pin 15 is removed from the switch 16. In this state the photographing accompanied with synchronized sound recording can be carried out by using a conventional release and a sound pick up microphone not shown in the drawing.

FIG. 9 shows the operation for releasing the cover of the magazine chamber for taking out the magazine after photograph, whereby the operation nob 52 has been turned clockwise almost by a half of the total rotation angle from the state shown in FIG. 8. As in this state the L-shaped part 12c of the movable member 12 has been turned anticlockwise around the shaft 54 by means of the arc shaped part 53a of the operation cam 53, the movable means such as the pinch roller 10, the head pad 11 and so on, on the movable means 12 have also been turned anticlockwise and removed from the sound recording unit 7. As further at this time the end 17g of the slide member 17 is not yet in contact with the arc shaped part 53a of the operation cam 53, the state is still kept locked as is shown in FIG. 8, whereby the slide member 17 is not displaced so that the operation nob 52 can be rotated with a very small strength. Hereby the switch 16 is opened by means of the pin 16 so that the sound recording circuit does not work any more.

FIG. 10 shows the state in which the operation nob 52 has been turned clockwise by the total rotation angle from the state shown in FIG. 9. In this process from the state shown in FIG. 9 to that shown in FIG. 10 the L-shaped part 12c of the movable member 12 is in contact with the same arc shaped part 53a despite of the rotation of the operation cam 53 and so is not displaced, so that the strength needed for the operation is only to displace the slide member 17 to be explained and so is very small. The end 17g of the slide member 17 is slided upwards (along the direction of the arrow C' in the drawing) by means of the arc shaped part 53a. In this way the lock piece 17d of the slide member 17 engaging with the lock part 4 provided on the cover 3 of the magazine chamber is also displaced upwards so as to release the binding of the lock part 4 so that the cover 3 of the magazine chamber can be released and the magazine 24 can be taken out.

Figure 11:
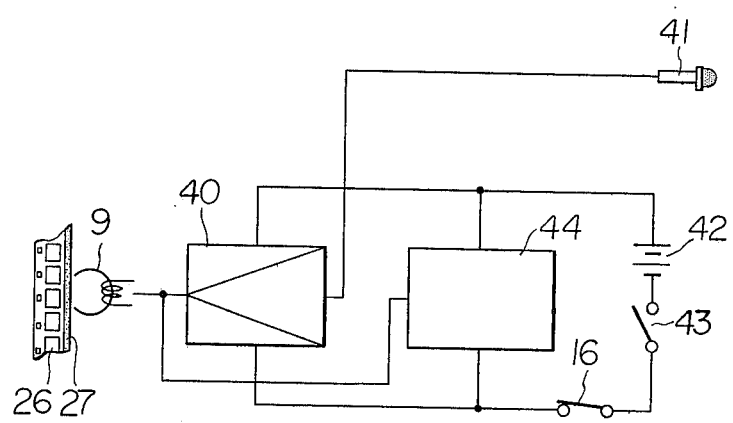
FIG. 11 shows a circuit diagram of an embodiment of the sound recording type applicable to the motion picture camera capable of synchronized sound recording according to the present invention shown in FIGS. 1, 5 and 6.

FIG. 11 shows an embodiment of the sound recording circuit applicable to the motion picture camera capable of synchronized sound recording according to the present invention shown in FIGS. 1, 2 and 3, whereby the film 26, the sound recording portion 27 on the film and the sound recording head 9 for recording the sound on the sound recording portion are the same as mentioned above. The above mentioned switch 16 which suspends the operation of the sound recording means shown in FIGS. 1 to 4, 5 and 6 to 10 is connected with the current source by means of the main switch 43. The above mentioned sound recording head 6 is connected with the amplifier circuit 40 which is connected with the sound pick up microphone 41 to be mounted on the motion picture camera shown in FIGS. 1 to 4 and 5 to 10 and at the same time with the current source. Further the above mentioned sound recording head 9 is connected with a conventional bias oscillator 44.

The sound recording circuit constructed in this way itself can be the conventional circuit and further the operation itself is also well known to the expert so that the explanation is simplified.

The sound information picked up by the microphone and converted into an electrical signal is amplified and then recorded on the sound recording portion 27 of the film together with the bias signal by means of the sound recording head 9.

The above mentioned switch 16 can either be constructed so as to suspend the sound recording operation of the sound recording circuit as mentioned above or be constructed so as to suspend the driving operation of the driving circuit of the conventional capstan 8 composing a continuous feeding means for the sound recording shown in FIGS. 1 to 4 and 5 to 10 in order to suspend the sound recording effect.

In case of the motion picture camera capable of synchronized sound recording composed as mentioned above according to the present invention, the operation member for engaging the sound recording unit with the movable member and for releasing the cover of the magazine chamber when loading the magazine can be displaced stepwise at least in three positions, i.e. the first, the second and the third position, whereby the above mentioned movable member can operate while the cover is locked when the operation member is in the first position, the above mentioned movable member can not operate while the cover is locked when the operation member is in the second position and the above mentioned movable member can not operate while the locking of the cover is released when the operation member is in the third position, whereby at least one position does not lie on a straight line when the first, the second and the third position are bound by a straight line with each other so that even when the operation nob is pushed along a certain direction by mistake the above mentioned operations can not be carried out at the same time namely the cover can not be opened, which is very profitable in practice.

What is claimed is:

1. A motion picture camera which permits recording image information and sound information concurrently on a photographic film contained in a film magazine with a sound recording track provided thereon, the camera comprising:
   a camera housing having a film magazine loading chamber which is provided with an inlet port opening directed toward the outside of the housing for loading and unloading a film magazine;
   an opening and closing lid selectively usable for covering said inlet port of the magazine loading chamber;
   locking means for locking said lid in its closed position at said inlet port of the magazine loading chamber;
   image forming means for recording image information on said film;
   a sound recording mechanism including sound recording means for recording sound information on the sound recording track of said film and film transporting means for causing the film to continuously travel past a point at which the sound recording means performs sound recording, the sound recording mechanism being divided into two parts disposed across the path of the film and operable in two variable modes such that, in the first mode, the film path is widened to facilitate film loading and, in the second mode, the film path is narrowed with the sound recording mechanism partially coming into contact with said film; and
   operating means for controlling the locking action of said locking means and the shifting between the two operating modes of said sound recording mechanism, the operating means being selectively shiftable, to first, second and third positions in a stepwise manner so that, in the first position, said locking means is held in an unlocking condition while the sound recording mechanism is held in said first mode, then, in the second position, the locking means is held in a locking condition while the sound recording mechanism is still held in the first mode and, in the third position, the sound recording mechanism is shifted into the second mode while the locking means is still maintained in the locking condition, the shifting path of the operating means being non-linear.

2. A camera as defined in claim 1 wherein said sound recording means is provided with a transducing head which is disposed in the first part of said sound recording mechanism to record sound information on said sound recording track of the film and a pad mamber which is disposed in the second part of the sound recording mechanism to permit bringing said transducing head into contact with said film to record sound information on the film.

3. A camera as defined in claim 1 wherein said film transporting means comprises a capstan member disposed in the first part of said sound recording mechanism and a pinch roller member disposed in the second part of said sound recording mechanism.

4. A camera as defined in claim 1, the direction in which said operating means shifts from the first position to the second position and is arranged to be approximately at a right angle to the direction in which the operating means shifts from the second position to the third position.

5. A camera as defined in claim 1 wherein said operating means has an L-shaped cam groove which is slidably engaged with a pin which is secured to said camera housing.

6. A camera as defined in claim 1 wherein a part of said locking means is disposed on said operating means.

7. A motion picture camera which permits recording image information and sound information concurrently on a photographic film contained in a film magazine with a sound recording track provided thereon, the camera comprising:
a camera housing having a film magazine loading chamber which is provided with an inlet port opening toward the outside for loading and unloading a film magazine;
an opening and closing lid selectively usable for covering said inlet port of the magazine loading chamber;
locking means for locking said lid in its closed position at said inlet port of the magazine loading chamber;
image forming means for recording image information on said film;
sound recording means having the following elements disposed on opposite sides of the path of said film:
a transducing head which records sound information recording track of said film and a pad member which is provided for bringing said transducing head into contact with the film, the pad member being arranged to be selectively shiftable between an engaging position in which the transducing head and the film come into operative contact with each other and a disengaging position in which the head and the film disengage from each other;
film transporting means for causing the film to continuously travel past a point at which the sound recording means can record sound information, the transporting means having first and second rotatable members which are disposed on opposite sides of the path of the film with at least the first of the two rotatable members being arranged to be shiftable between an engaging position in which the first rotatable member comes into operative engagement with the second member to make film feeding possible and a disengaging position in which the film feeding operation becomes impossible;
shifting means for controlling said position shifting of the pad member and that of the first rotatable member, the shifting means being selectively shiftable between a first position in which both the pad member and the first rotatable member are set into their respective engaging positions and a second position in which the pad member and the first rotatable member are set into their respective disengaging positions; and
operating means for controlling the locking action of said locking means and the position shifting of said shifting means, the operating means being selectively shiftable between three stepwise positions, which are arranged in such a manner that, in a first position, the operating means holds the locking means in an unlocking condition while the shifting means is held in its second position and, in a second position, the locking means is held in a locking condition while the shifting means is held in its second position and further, in a third position, the shifting means is brought into its first position while the locking means is retained in the locking condition; the direction in which said operating means shifts from the first position to the second position being approximately at a right angle to the direction in which the operating means shifts from the second position to the third position.

8. A camera as defined in claim 7 wherein said operating means has an L-shaped cam groove which is slidably engaged with a pin which is secured to the camera housing.

9. A camera as defined in claim 7 wherein a part of said locking meanns is disposed on said operating means.

10. A camera as defined in claim 7 wherein said sound recording means includes a sound recording circuit electrically connected to said transducing head and a switch for controlling a power supply to said sound recording circuit, said switch being disposed within an operative range of said shifting means and being arranged in such a way as to be closed in relation to the shifting of said shifting means to the first position thereof.

11. A motion picture camera which permits recording image information and sound information concurrently on a photographic film contained in a film magazine with a sound recording track provided thereon, the camera comprising:
a camera housing having a film magazine loading chamber which is provided with an inlet port opening toward the outside for loading and unloading a film magazine;
an opening and closing lid usable for covering said inlet port of the magazine loading chamber;
locking means for locking said lid in its closed position at said inlet port of the magazine loading chamber, the locking means being selectively shiftable between a locking position in which the locking means engages with said opening and closing lid to lock the latter in a closed position and an unlocking position in which the locking means disengages from the opening and closing lid;
image forming means for recording image information on said film;

sound recording means having the following elements disposed on opposite sides of the path of said film:

a transducing head which records sound information on the sound recording track of said film and a pad member which is provided for bringing said transducing head into contact with the film, the pad member being arranged to be selectively shiftable between an engaging position in which the transducing head and the film come into operative contact with each other and a disengaging position in which the head and the film disengages from each other;

film transporting means for causing the film to continuously travel past a point at which the sound recording means can record sound information, the transporting means having first and second rotatable members which are disposed on opposite sides of the film path, with at least the first of the two rotatable members being arranged to be shiftable between an engaging position in which the first rotatable member comes into operative engagement with the second rotatable member to make film feeding possible and a disengaging position in which the film feeding operation becomes impossible;

shifting means for controlling said position shifting of the pad member and the first rotatable member, the shifting means being selectively shiftable between a first position in which both the pad member and the first rotatable member are set in engaging positions respectively and a second position in which the pad member and the first rotatable member are set in their disengaging positions respectively; and operating means for controlling said position shifting of the locking means and that of the shifting means, the operating means being selectively shiftable between three stepwise positions, which are arranged in such a manner that, in a first position, the operating means holds the locking means in the unlocking position while the shifting means is held in its second position and in a second position, the locking means is held in the locking position while the shifting means is held in its second position and further, in a third position, the locking means is held in the locking position while the shifting means is held in its first position; the direction in which said operating means shifts from the second position to the third position being approximately perpendicular to the direction in which the operating means shifts from the first position to the second position.

12. A camera as defined in claim 11 wherein there is provided means for preventing said operating means from shifting from the first position directly to the third position and from the third position directly to the first position without passing through the second position.

13. A motion picture camera which permits recording image information and sound information concurrently on a photographic film contained in a film magazine with a sound recording track provided thereon, the camera comprising:

a camera housing having a film magazine loading chamber which is provided with an inlet port opening toward the outside for loading and unloading a film magazine;

an opening and closing lid which is selectively used for covering said inlet port of the magazine loading chamber;

locking means for locking said lid in its closed position at said inlet port of the magazine loading chamber, the locking means being selectively shiftable between a locking position in which the locking means engages with said opening and closing lid to lock the latter in a closed position and an unlocking position in which the locking means disengages from the opening and closing lid;

image forming means for recording image information on said film;

sound recording means having the following elements disposed on opposite sides of the path of said film;

a transducing head which records sound information on the sound recording track of said film and a pad member for bringing said transducing head into contact with the film, the pad member being arranged to be selectively shiftable between an engaging position in which the transducing head and the film come into operative contact with each other and a disengaging position in which the head and the film disengage from each other;

film transporting means for causing the film to continuously travel past a point at which the sound recording means can record sound information, the transporting means having first and second rotatable members which are disposed on opposite sides of the film path, with at least the first of the two rotatable members being arranged to be shiftable between an engaging position in which the first rotatable member comes into operative engagement with the second rotatable member to make film feeding possible and a disengaging position in which the film feeding operation becomes impossible;

shifting means for controlling said position shifting of the pad member and the first rotatable member, the shifting means being selectively shiftable between a first position in which both the pad member and the first rotatable member are set in their engaging positions respectively and a second position in which the pad member and the first rotatable member are set in their respective disengaging positions; and a rotatable cam which is constantly in contact with said locking means and said shifting means, said cam being arranged to rotate so as to bring about different modes of operation in a stepwise manner such that, in a first mode, the cam holds the locking means in the unlocking position and the shifting means in its second position and, in a second mode, the cam holds the locking means in the locking position and the shifting means in its second position and further, in a third mode, the cam holds the locking means in the locking position and the shifting means in its first position.

* * * * *